United States Patent
Murthy (10) Patent No.: US 10,002,071 B2
(45) Date of Patent: Jun. 19, 2018

(54) METHOD AND A SYSTEM FOR AUTOMATING TEST ENVIRONMENT OPERATIONAL ACTIVITIES

(71) Applicant: Wipro Limited, Bangalore (IN)

(72) Inventor: Peri Narasimha Murthy, Bangalore (IN)

(73) Assignee: Wipro Limited, Bangalore (IN)

( * ) Notice: Subject to any disclaimer, the term of this patent is extended or adjusted under 35 U.S.C. 154(b) by 142 days.

(21) Appl. No.: 15/085,716

(22) Filed: Mar. 30, 2016

(65) Prior Publication Data

US 2017/0277626 A1 Sep. 28, 2017

(30) Foreign Application Priority Data

Mar. 23, 2016 (IN) .............................. 201641010257

(51) Int. Cl.
*G06F 11/00* (2006.01)
*G06F 11/36* (2006.01)

(52) U.S. Cl.
CPC ...... *G06F 11/3692* (2013.01); *G06F 11/3664* (2013.01); *G06F 11/3684* (2013.01); *G06F 11/3688* (2013.01)

(58) Field of Classification Search
USPC ........................................................ 714/38.1
See application file for complete search history.

(56) References Cited

U.S. PATENT DOCUMENTS

| | | | |
|---|---|---|---|
| 7,735,080 B2 | 6/2010 | Barturen et al. | |
| 2009/0182794 A1* | 7/2009 | Sekiguchi | G06F 11/0748 |
| 2010/0070795 A1* | 3/2010 | Shimada | H04L 41/0631 |
| | | | 714/2 |

(Continued)

OTHER PUBLICATIONS

Mylavarapu, V.K., "The Business Case for Test Environment Management Services," Cognizant Reports, 7 pp., retrieved at http://www.cognizant.com/InsightsWhitepapers/The-Business-Case-for-Test-Environment-Management-Services.pdf (Nov. 2013).

(Continued)

*Primary Examiner* — Sarai E Butler
(74) *Attorney, Agent, or Firm* — LeClairRyan PLLC (57) ABSTRACT

A method and a system are provided method for automating test environment operational activities. The method comprises creating, by a unified test environment management (UTEM) system, a configuration management database comprising information pertaining to at least one of a test infrastructure, test data, and a plurality of test environment incidents. The method comprises defining, by the (UTEM) system, one or more test environment incident management policies based on Information Technology Infrastructure Library and the configuration management database. In an embodiment, the one or more test environment incident management policies are defined to manage the plurality of test environment incidents. The method comprises selecting, by the (UTEM) system, a testing environment for resolving the plurality of test environment incidents based on the defined one or more test environment incident management policies. The method comprises generating, by the (UTEM) system, a plurality of reports corresponding to the selected testing environment.

12 Claims, 3 Drawing Sheets

A method 200 for automating test environment operational activities (56) References Cited

U.S. PATENT DOCUMENTS

2013/0318396 A1* 11/2013 Plate .................. G06F 11/3612
714/25
2014/0189435 A1* 7/2014 Manuel-Devadoss
.......................... H04L 41/0253
714/43

OTHER PUBLICATIONS

Micro Focus, "Silkcentral Test Manager," retrieved at https://www.microfocus.com/assets/silkcentral-test-manager-data.tcm6-6897.pdf, 4 pp. (2012).
SAP, "SAP Standard for Test Management. SAP Solution Manager 7.1," retrieved at https://support.sap.com/dam/library/SAP%20Support%20Portal/support-programs-services/methodologies/support-standards/e2e-standard-for-test-management.pdf, 40 pp. (2014).

\* cited by examiner

FIG. 1: A unified test environment management (UTEM) system 100

FIG. 2: A method 200 for automating test environment operational activities

FIG. 3: Example Computer System

METHOD AND A SYSTEM FOR AUTOMATING TEST ENVIRONMENT OPERATIONAL ACTIVITIES

This application claims the benefit of Indian Patent Application Serial No. 201641010257, filed Mar. 23, 2016, which is hereby incorporated by reference in its entirety.

FIELD

The present subject matter is related, in general to software testing, and more particularly, but not exclusively to a method and a system for automating test environment operational activities.

BACKGROUND

Nowadays, testing timelines are shrinking day by day and focus on test environment availability is increasing rapidly. Generally, test environments for software testing include multiple instances, numerous assets and stakeholders. Thus, provisioning, deploying, monitoring and managing such test environments is a huge challenge for most organizations. Hence, agile testing methodology is being adopted to address this challenge. However, due to the frequently changing nature of the business requirements it is difficult to manage the test environment.

Additionally, conventional test environment management has challenges in managing large test environment landscape and achieving higher test environment availability to the testing team. Further, there are many challenges with conventional test environment management. Such challenges include no ownership on test environment management, lower test environment availability, higher operational cost, fragmented operating model, and no governance.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

According to embodiments illustrated herein, there may be provided a method for automating test environment operational activities. The method comprises creating, by a unified test environment management system, a configuration management database comprising information pertaining to at least one of test infrastructure, test data, and a plurality of test environment incidents. The method further comprises defining, by the unified test environment management system, one or more test environment incident management policies based on Information Technology Infrastructure Library and the configuration management database, wherein the one or more test environment incident management policies are defined to manage the plurality of test environment incidents. The method further comprises selecting, by the unified test environment management system, a test environment for resolving the plurality of test environment incidents based on the defined one or more test environment incident management policies. The method further comprises generating, by the unified test environment management system, a plurality of reports corresponding to the selected testing environment.

According to embodiments illustrated herein, there may be provided a system to automate test environment operational activities. The system may correspond to a unified test environment management system. The unified test environment management system comprises a processor and a memory communicatively coupled to the processor. The memory stores processor instructions, which, on execution, causes the processor to create a configuration management database comprising information pertaining to at least one of test infrastructure, test data, and a plurality of test environment incidents. The processor may be configured to define one or more test environment incident management policies based on Information Technology Infrastructure Library and the configuration management database, wherein the one or more test environment incident management policies are defined to manage the plurality of test environment incidents. The processor may be configured to select a test environment for resolving the plurality of test environment incidents based on the defined one or more test environment incident management policies. The processor may be configured to generate a plurality of reports corresponding to the selected testing environment.

According to embodiments illustrated herein, a non-transitory computer-readable storage medium having stored thereon, a set of computer-executable instructions for causing a computer comprising one or more processors to perform steps of creating a configuration management database comprising information pertaining to at least one of test infrastructure, test data, and a plurality of test environment incidents. The one or more processors may be configured to define one or more test environment incident management policies based on Information Technology Infrastructure Library and the configuration management database, wherein the one or more test environment incident management policies are defined to manage the plurality of test environment incidents. The one or more processors may be configured to select a test environment for resolving the plurality of test environment incidents based on the defined one or more test environment incident management policies. The one or more processors may be configured to generate a plurality of reports corresponding to the selected testing environment.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
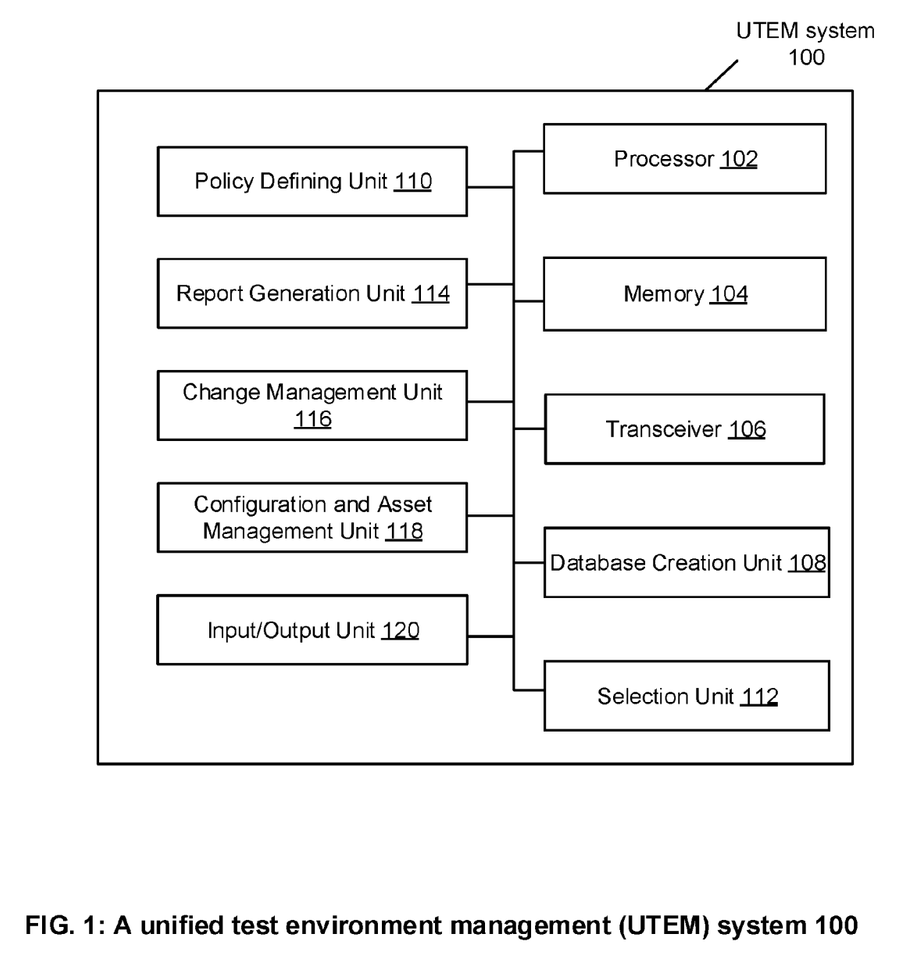
FIG. 1 is a block diagram that illustrates a unified test environment management system (UTEM) to automate test environment operational activities, in accordance with at least one embodiment.

FIG. 1 illustrates a block diagram of a unified test environment management (UTEM) system 100, according to some embodiments of the present disclosure. The UTEM system 100 further comprises a processor 102, a memory 104, a transceiver 106, a database creation unit 108, a policy defining unit 110, a selection unit 112, a report generation unit 114, a change management unit 116, a configuration and asset management unit 118, and an Input/Output (I/O) unit 120. The processor 102 may be communicatively coupled to the memory 104, the transceiver 106, the database creation unit 108, the policy defining unit 110, the selection unit 112, the report generation unit 114, the change management unit 116, and the configuration and the asset management unit 118, and the Input/Output (I/O) unit 120.

The processor 102 comprises suitable logic, circuitry, interfaces, and/or code that may be configured to execute a set of instructions stored in the memory 104. The processor 102 may be implemented based on a number of processor technologies known in the art. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 104 comprises suitable logic, circuitry, interfaces, and/or code that may be configured to store the set of instructions, which are executed by the processor 102. In an embodiment, the memory 104 may be configured to store one or more programs, routines, or scripts that may be executed in coordination with the processor 102. The memory 104 may be implemented based on a Random Access Memory (RAM), a Read-Only Memory (ROM), a Hard Disk Drive (HDD), a storage server, and/or a Secure Digital (SD) card.

The transceiver 106 comprises of suitable logic, circuitry, interfaces, and/or code that may be configured to communicate data between each of the units, via a communication network. The transceiver 106 may implement one or more known technologies to support wired or wireless communication with the communication network. In an embodiment, the transceiver 106 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 106 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)

The database creation unit 108 comprises suitable logic, circuitry, interfaces, and/or code that may be configured to create a configuration management database (CMDB) comprising information pertaining to at least one of a test infrastructure, test data, and a plurality of test environment incidents. The database creation unit 108 may be further configured to maintain the CMDB. Further, the database creation unit 108 may be configured to create a knowledge database based on historic data associated with the plurality of test environment incidents and the selected testing environment.

The policy defining unit 110 comprises suitable logic, circuitry, interfaces, and/or code that may be configured to define one or more test environment incident management policies based on Information Technology Infrastructure Library and the configuration management database. In an embodiment, the one or more test environment incident management policies may be defined to manage the plurality of test environment incidents.

The selection unit 112 comprises suitable logic, circuitry, interfaces, and/or code that may be configured to select a test environment for resolving the plurality of test environment incidents based on the defined one or more test environment incident management policies. The report generation unit 114 comprises suitable logic, circuitry, interfaces, and/or code that may be configured to generate a plurality of reports corresponding to the selected testing environment. The report generation unit 114 may be further configured to create a dashboard that may be utilized to display the plurality of reports.

The change management unit 116 comprises suitable logic, circuitry, interfaces, and/or code that may be configured to address the changes that are required to be made in the test environment based on one or more business policies. The configuration and the asset management unit 118 comprises suitable logic, circuitry, interfaces, and/or code that may be configured to manage one or more activities related to one or more assets in an organization.

The Input/Output (I/O) unit 120 comprises suitable logic, circuitry, interfaces, and/or code that may be configured to receive an input or transmit an output. The input/output unit 120 comprises of various input and output devices that are configured to communicate with the processor 102. Examples of the input devices include, but are not limited to, a keyboard, a mouse, a joystick, a touch screen, a microphone, a camera, and/or a docking station. Examples of the output devices include, but are not limited to, a display screen and/or a speaker.

In operation, the UTEM system 100 may be configured provide an integrated service platform for managing one or more test environment operational activities. UTEM system 100 may be configured to create a single point of contact for a testing team to co-ordinate with, one or more stakeholders accountable for the test environments, and one or more related operational activities. For the purpose of implementing the UTEM system 100, at an enterprise level, all the testing teams must be integrated under one business unit. For example, all the stakeholders associated with the each of the test environments may be brought under one business unit.

After all the testing teams are integrated under one business unit, the UTEM system 100 may be configured to establish a centralized governance between one or more stakeholders associated with the test environment operational activities and one or more testers. In an embodiment, the centralized governance may be established by implementing test environment standardization processes based on one or more industry standards and the Information Technology Infrastructure Library. In an embodiment, the Information Technology Infrastructure Library may correspond to the one or more best practices adopted in the industry. In an embodiment, while establishing the centralized governance, the UTEM system 100 may highlight one or more risks and champion mitigation plans. Further, a mechanism may be implemented to determine a measure of efficiency and analyze the performance of one or more existing test environments. In an embodiment, the UTEM system 100 may implement one or more Service Level Agreements (SLAs) for environment services based on current measure of efficiency. Additionally, a target operating model with standard practices for planning, management, monitor and control may be implemented by the UTEM system 100 for establishing the centralized governance. Further, the UTEM system 100 may define one or more KPI's for determining the measure of efficiency based on target operating model.

In an embodiment, in order to implement centralized governance, the UTEM system 100 may implement a centralized program governance team that may be configured to implement a Planning-Steering-Review mechanism and maintain standards for all the test environments at the enterprise level. The key activities of the program governance may comprise, but not limited to, at least one of the below mentioned activities:

1. Plan, Steer and Review the SLA
2. Standardization of the service across all test environments at enterprise level
3. Demand forecasting and capacity planning
4. Implementation of best practices as defined ITIL
5. Delivery by automated tools Thus the UTEM system 100 adheres to a robust centralized governance and hence may be utilized to closely monitor the performance of test environments and act as a single point of contact for one or more stakeholders and one or more test assets.

After establishing a robust governance, the UTEM system 100 may be configured to automate day to day activities using third party or in house scripts. For the purpose of automating test environment operational activities, the UTEM system 100 has dedicated modules to cater to the automation of each of the individual activities. In an embodiment, the test environment operational activities may comprise, but not limited to, at least one of test infrastructure management, test data management, testing environment support, assets and inventory management, code deployment management activities, problem management, change management, release management, and stakeholder communication.

The database creation unit 104 may be configured to create the configuration management database (CMDB) comprising information pertaining to at least one of test infrastructure, test data, and a plurality of test environment incidents. The database creation unit 108 may be further configured to maintain the CMDB. In an embodiment, the CMDB may comprise of a centralized inventory database. The centralized inventory database comprises information pertaining to classification associated with one or more test environment assets, asset location, unique identification number associated with the one or more test environment assets, and the like. Additionally the CMDB may be integrated with the change management unit 114 and the one or more operational activities associated with one or more incidents in the organization. Further, in an embodiment, the database creation unit 104 may be configured to create a GOLD copy of the CMDB and also perform test environment refresh activities after a pre-defined time interval. The environment refresh activities identify un-utilized test environments, initiate refresh activity and move one or more resources to a ready state so that a new request may be accommodated. In an embodiment, database creation unit 104 may be configured to proactively generate test data for static test data requirements.

After creation of the CMDB, the policy defining unit 106 may be configured to define one or more test environment incident management policies based on Information Technology Infrastructure Library and the configuration management database (CMDB). Such one or more test environment incident management policies may be utilized to define and implement incident management process. Further, such test environment incident management policies may be utilized to define and implement a process for configuration controls and audit mechanism.

The selection unit 112 may be configured to check one or more parameters comprising the availability of the test environment based on requirements, release cycle, reservation by another stakeholders/tester. Based on the one or more parameters and the defined one or more test environment incident management policies, the selection unit 112 may be configured to select a test environment for resolving the plurality of test environment incidents. The selection unit 112 may be further configured to determine conflicts in test environment booking, test environment sharing, and the like. In an embodiment, when more than one project contend for the same asset or test environment at the same time then the selection unit 112 may be configured to implement test environment sharing so that plurality of projects may co-exist. In an embodiment, the selection unit 112 may provide a dashboard to the end user that enables the user to view the status associated with the test environment selection. Such dashboard may provide information pertaining to when test environments are booked, ready to be booked, or are free. Such proactive measures may enable the UTEM system 100 to reduce conflicts.

Further, the report generation unit 114 may be configured to generate a plurality of reports corresponding to the selected testing environment. In an embodiment, the plurality of reports may comprise at least one of availability of the test environment, behavior of the test environment, and number of the plurality of test environment incidents. In an embodiment, a dashboard may be created to display the plurality of reports on a display screen of the unified test environment management system. In an embodiment, the plurality of reports provide detailed test environment reports to one or more stakeholders based on the roles allocated to each of the stakeholders. Thus, the plurality of reports represented on the dashboard provided a comprehensive view of the test environments. Such reports may be further utilized for analysis.

Further, the database creation unit 108 may be configured to create a knowledge database based on historic data associated with the plurality of test environment incidents and the selected test environment. For example, the database creation unit 108 may monitor which test environment was selected to resolve a particular test environment incident from the plurality of test environment incidents and accordingly may store such knowledge in the knowledge database. Such knowledge (historic data) may be utilized by the selection unit 112 to select the test environment to resolve the plurality of test environment incidents.

In an embodiment, the UTEM system 100 may be configured to integrate the CMDB with change management unit 116. The change management unit 116 may be configured to address the changes that are required to be made in the test environment based on one or more business policies. The configuration and the asset management unit 118 comprises suitable logic, circuitry, interfaces, and/or code that may be configured to manage one or more activities related to one or more assets in an organization. The configuration and the asset management unit 118 may be configured to create a relationship diagram with dependency matrix based on the data in the CMDB. Thus, the one or more activities related to the one or more assets in the organization may be managed by the configuration and the asset management unit 118 based on the relationship diagram.

In an embodiment, the UTEM system 100 may be configured to define and implement one or more best practices in accordance with ITIL for code deployment activities. Further, the UTEM system 100 may be configured to perform version verifications and configuration checks corresponding to each test data and test environment. In an embodiment, the UTEM system 100 may be configured to deploy the code as per the one or more defined policies. Such one or more defined policies may be utilized to automate code deployment activities.

In an embodiment, the UTEM system 100 may be configured to provide coordination and support services to the one or more stakeholders of the plurality test of environments and the one or more testers by implementing one or more best practices in accordance with ITIL to manage test environment outages. Further, the database creation unit 104 may be configured to create a Known Error Database (KEDB) with integration points to issue resolution of the plurality of test incidents. Additionally, the KEDB may be utilized by the change management unit 116 to provide support to the one or more stakeholders of the plurality test of environments and the one or more testers.

Thus, the UTEM system 100 enables in creating a single point of contact and providing a seamless coordination between testing teams, stakeholders and all activities related to testing. Further, the UTEM system 100 integrates all activities related to test infrastructure management, test data management, coordination and support, and code deployment management activities. Additionally, the UTEM system 100 automates the test environment operational activities as disclosed herein and helps to achieve higher efficiency in the test environment through service automation, increased coordination and clearer operational visibility.

In an embodiment, the change management processes may be automated by the change management unit 116 by automating the change request initiation and approval activities pertaining to the test environments and the underlying test infrastructure. Additionally change management processes integrates with CMDB, incident management and knowledge management modules.

In an embodiment, the release management processes may be automated by the UTEM system 100 by automating release calendar information which is a pre-requisite for test environment booking. Additionally release information integrates with test environment booking, test environment contention management and incident management processes to achieve a centralized repository on test release and test environment calendar.

In an embodiment, the stakeholder communication may be simplified and automated by the UTEM system 100 by automating stakeholder communication and broadcasting activities. This includes broadcasting test environment outages, schedule maintenance activities and important test environment related information. Additionally the communication regarding environment assets availability, license information and booking confirmations can also be automated to achieve standardization on communication within the test environment teams and its associated stakeholders.

Advantages of the Invention

Figure 2:
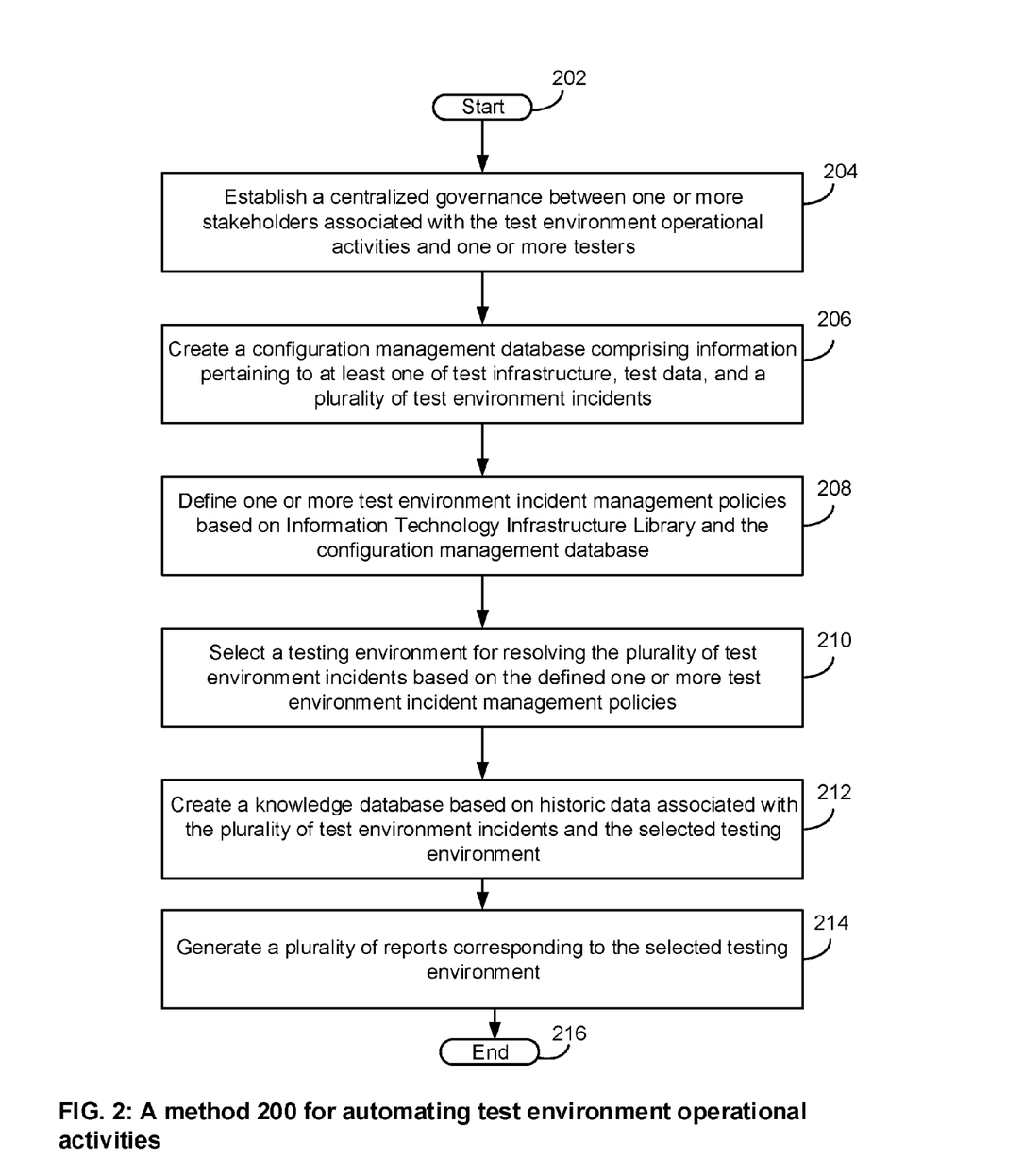
FIG. 2 is a flowchart illustrating a method for automating test environment operational activities in accordance with some embodiments of the present disclosure.

1. UTEM system 100 provides a single point of contact and complete ownership to the end users like testing team. This includes test infrastructure, test data provisioning, test incident management, test environment support and monitoring activities.
2. The UTEM system 100 operates based on a robust centralized governance thereby enabling integration of services.
3. Predictable level of service with improved ownership and accountability
4. Increased efficiencies in Environment Management Operations e.g. 12-15% Availability of historical data
5. Proactive Environment Management services and closer collaboration
6. Increased productivity and reduced downtimes. E.g. Deployment lead time reduction by 25-40%
7. Reduced service response time by 5 to 10%
8. Proactive Service Management and increased Environment Availability FIG. 2 is a flowchart illustrating a method 200 for automating test environment operational activities in accordance with some embodiments of the present disclosure.

The method starts at step 202 and proceeds to step 204. At step 204, the UTEM system 100 may be configured to establish a centralized governance between one or more stakeholders associated with the test environment operational activities and one or more testers. At step 206, the UTEM system 100 may be configured to create a configuration management database comprising information pertaining to at least one of test infrastructure, test data, and a plurality of test environment incidents. At step 208, the UTEM system 100 may be configured to define one or more test environment incident management policies based on Information Technology Infrastructure Library and the configuration management database. At step 210, the UTEM system 100 may be configured to select a testing environment for resolving the plurality of test environment incidents based on the defined one or more test environment incident management policies. At step 212, the UTEM system 100 may be configured to create a knowledge database based on historic data associated with the plurality of test environment incidents and the selected testing environment. At step 214, the UTEM system 100 may be configured to generate a plurality of reports corresponding to the selected testing environment. Control passes to end step 216.

Computer System

Figure 3:
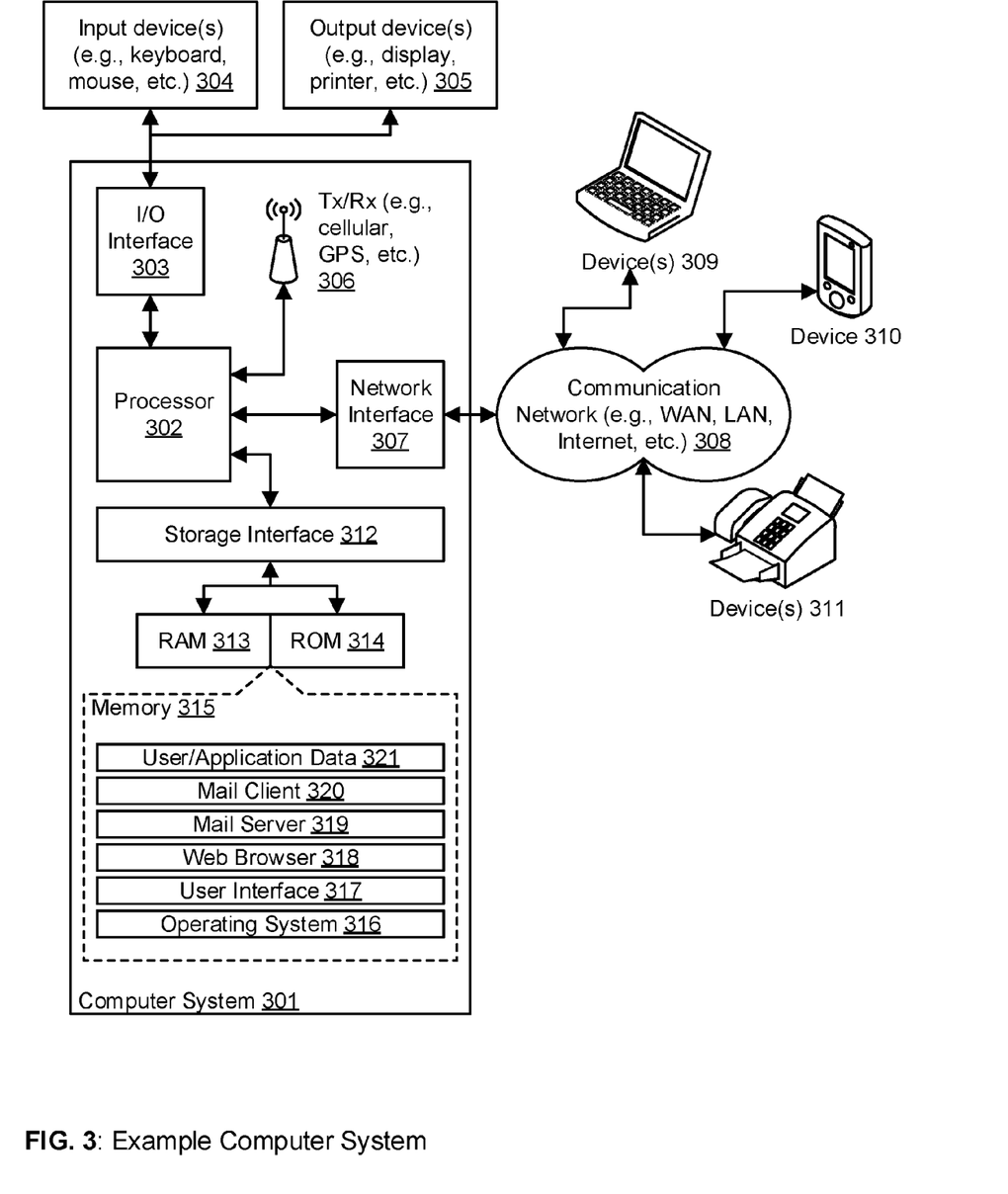
FIG. 3 illustrates a block diagram of an exemplary computer system for implementing embodiments consistent with the present disclosure.

FIG. 3 illustrates a block diagram of an exemplary computer system for implementing embodiments consistent with the present disclosure. In an embodiment, the regression testing system 300 is used to perform regression integration testing. The regression testing system 300 may comprise a central processing unit ("CPU" or "processor") 302. The processor 302 may comprise at least one data processor for executing program components for executing user- or system-generated business processes. A user may include a person, a person using a device such as such as those included in this invention, or such a device itself. The processor 302 may include specialized processing units such as integrated system (bus) controllers, memory management control units, floating point units, graphics processing units, digital signal processing units, etc.

The processor 302 may be disposed in communication with one or more input/output (I/O) devices (311 and 312) via I/O interface 301. The I/O interface 301 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 301, the computer system 300 may communicate with one or more I/O devices (311 and 312).

In some embodiments, the processor 302 may be disposed in communication with a communication network 309 via a network interface 303. The network interface 303 may communicate with the communication network 309. The network interface 303 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 303 and the communication network 309, the computer system 300 may communicate with one or more user devices 310 (a, . . . , n). The communication network 309 can be implemented as one of the different types of networks, such as intranet or Local Area Network (LAN) and such within the organization. The communication network 309 may either be a dedicated network or a shared network, which represents an association of the different types of networks that use a variety of protocols, for example, Hypertext Transfer Protocol (HTTP), Transmission Control Protocol/ Internet Protocol (TCP/IP), Wireless Application Protocol (WAP), etc., to communicate with each other. Further, the communication network 309 may include a variety of network devices, including routers, bridges, servers, computing devices, storage devices, etc. The one or more user devices 310 (a, . . . , n) may include, without limitation, personal computer(s), mobile devices such as cellular telephones, smartphones, tablet computers, eBook readers, laptop computers, notebooks, gaming consoles, or the like.

In some embodiments, the processor 302 may be disposed in communication with a memory 305 (e.g., RAM 313, ROM 314, etc.) via a storage interface 304. The storage interface 304 may connect to memory 305 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 305 may store a collection of program or database components, including, without limitation, user interface application 306, an operating system 307, web server 308 etc. In some embodiments, computer system 300 may store user/application data 306, such as the data, variables, records, etc. as described in this invention. Such databases may be implemented as fault-tolerant, relational, scalable, secure databases such as Oracle or Sybase.

The operating system 307 may facilitate resource management and operation of the computer system 300. Examples of operating systems include, without limitation, Apple Macintosh OS X, UNIX, Unix-like system distributions (e.g., Berkeley Software Distribution (BSD), FreeBSD etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. User interface 306 may facilitate display, execution, interaction, manipulation, or operation of program components through textual or graphical facilities. For example, user interfaces may provide computer interaction interface elements on a display system operatively connected to the computer system 300, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 300 may implement a web browser 308 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 300 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 300 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for automating test environment operational activities, the method comprising:
   creating, by a unified test environment management device, a configuration management database comprising information pertaining to at least one of test infrastructure, test data, and a plurality of test environment incidents;
   establishing, by the unified test environment management device, a centralized governance between one or more stakeholders associated with the test environment operational activities and one or more testers, wherein establishing the centralized governance comprises implementing test environment standardization processes based on one or more industry standards and Information Technology Infrastructure Library;
   defining, by the unified test environment management device, one or more test environment incident management policies based on the Information Technology Infrastructure Library and the configuration management database, wherein the one or more test environment incident management policies are defined to manage the plurality of test environment incidents;
   selecting, by the unified test environment management device, a test environment for resolving the plurality of test environment incidents based on the defined one or more test environment incident management policies; and
   generating, by the unified test environment management device, a plurality of reports corresponding to the selected testing environment.

2. The method of claim 1 further comprising creating a knowledge database based on historic data associated with the plurality of test environment incidents and the selected testing environment.

3. The method of claim 1, wherein the plurality of reports comprise at least one of availability of the test environment, behavior of the test environment, and number of the plurality of test environment incidents.

4. The method of claim 1, wherein the test environment operational activities comprise at least one of test infrastructure management, test data management, test environment support, assets and inventory management, code deployment management activities, problem management, change management, release management, and stakeholder communication.

5. A unified test environment management device comprising:
　a processor; and
　a memory communicatively coupled to the processor, wherein the memory stores processor instructions, which, on execution, causes the processor to:
　create a configuration management database comprising information pertaining to at least one of test infrastructure, test data, and a plurality of test environment incidents;
　establish a centralized governance between one or more stakeholders associated with the test environment operational activities and one or more testers, wherein establishing the centralized governance comprises implementing test environment standardization processes based on one or more industry standards and Information Technology Infrastructure Library;
　define one or more test environment incident management policies based on the Information Technology Infrastructure Library and the configuration management database, wherein the one or more test environment incident management policies are defined to manage the plurality of test environment incidents;
　select a test environment for resolving the plurality of test environment incidents based on the defined one or more test environment incident management policies; and
　generate a plurality of reports corresponding to the selected testing environment.

6. The unified test environment management system of claim 5, wherein the processor is further configured to create a knowledge database based on historic data associated with the plurality of test environment incidents and the selected testing environment.

7. The unified test environment management system of claim 5, wherein the plurality of reports comprise at least one of availability of the test environment, behavior of the test environment, and number of the plurality of test environment incidents.

8. The unified test environment management system of claim 5, wherein the test environment operational activities comprise at least one of test infrastructure management, test data management, test environment support, assets and inventory management, code deployment management activities, problem management, change management, release management, and stakeholder communication.

9. A non-transitory computer-readable storage medium having stored thereon, a set of computer-executable instructions for causing a computer comprising one or more processors to perform steps comprising:
　creating a configuration management database comprising information pertaining to at least one of test infrastructure, test data, and a plurality of test environment incidents;
　establishing a centralized governance between one or more stakeholders associated with the test environment operational activities and one or more testers, wherein establishing the centralized governance comprises implementing test environment standardization processes based on one or more industry standards and Information Technology Infrastructure Library;
　defining one or more test environment incident management policies based on the Information Technology Infrastructure Library and the configuration management database, wherein the one or more test environment incident management policies are defined to manage the plurality of test environment incidents;
　selecting a test environment for resolving the plurality of test environment incidents based on the defined one or more test environment incident management policies; and
　generating a plurality of reports corresponding to the selected testing environment.

10. The medium as set forth in claim 9 further comprising creating a knowledge database based on historic data associated with the plurality of test environment incidents and the selected testing environment.

11. The medium as set forth in claim 9 wherein the plurality of reports comprise at least one of availability of the test environment, behavior of the test environment, and number of the plurality of test environment incidents.

12. The medium as set forth in claim 9 wherein the test environment operational activities comprise at least one of test infrastructure management, test data management, test environment support, assets and inventory management, code deployment management activities, problem management, change management, release management, and stakeholder communication.

* * * * *